US011960404B2

(12) United States Patent
Kotra et al.

(10) Patent No.: US 11,960,404 B2
(45) Date of Patent: Apr. 16, 2024

(54) METHOD AND APPARATUS FOR REDUCING THE LATENCY OF LONG LATENCY MEMORY REQUESTS

(71) Applicant: Advanced Micro Devices, Inc., Santa Clara, CA (US)

(72) Inventors: Jagadish B. Kotra, Austin, TX (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/029,976

(22) Filed: Sep. 23, 2020

(65) Prior Publication Data

US 2022/0091986 A1  Mar. 24, 2022

(51) Int. Cl.
G06F 12/0875 (2016.01)

(52) U.S. Cl.
CPC .... G06F 12/0875 (2013.01); *G06F 2212/452* (2013.01)

(58) Field of Classification Search
CPC .................. G06F 12/0875; G06F 2212/452
See application file for complete search history.

(56) References Cited

U.S. PATENT DOCUMENTS

| 2007/0005941 A1* | 1/2007 | Ranganathan | G06F 9/3875 |
| | | | 712/218 |
| 2008/0263325 A1* | 10/2008 | Kudva | G06F 9/3851 |
| | | | 712/203 |
| 2009/0216983 A1* | 8/2009 | Bekooij | G06F 8/4441 |
| | | | 711/E12.002 |
| 2013/0212330 A1* | 8/2013 | Brittain | G06F 13/1626 |
| | | | 711/E12.001 |

(Continued)

OTHER PUBLICATIONS

Definition of 'mark', Webster's Online Dictionary, Feb. 4, 2010, https://www.webster-dictionary.org/definition/mark, https://web.archive.org/web/20100204213853/https://www.webster-dictionary.org/definition/mark (Year: 2010).*

(Continued)

*Primary Examiner* — Michael Krofcheck
(74) *Attorney, Agent, or Firm* — Kowert, Hood, Munyon, Rankin & Goetzel, P.C.; Rory D. Rankin

(57) ABSTRACT

Systems, apparatuses, and methods for efficiently processing memory requests are disclosed. A computing system includes at least one processing unit coupled to a memory. Circuitry in the processing unit determines a memory request becomes a long-latency request based on detecting a translation lookaside buffer (TLB) miss, a branch misprediction, a memory dependence misprediction, or a precise exception has occurred. The circuitry marks the memory request as a long-latency request such as storing an indication of a long-latency request in an instruction tag of the memory request. The circuitry uses weighted criteria for (Continued)

scheduling out-of-order issue and servicing of memory requests. However, the indication of a long-latency request is not combined with other criteria in a weighted sum. Rather, the indication of the long-latency request is a separate value. The circuitry prioritizes memory requests marked as long-latency requests over memory requests not marked as long-latency requests.

20 Claims, 9 Drawing Sheets

(56) References Cited

U.S. PATENT DOCUMENTS

| | | | | |
|---|---|---|---|---|
| 2014/0176586 | A1* | 6/2014 | Gruber | G06F 12/0607 |
| | | | | 345/533 |
| 2014/0208075 | A1* | 7/2014 | McCormick, Jr. | G06F 9/3842 |
| | | | | 712/207 |
| 2016/0371014 | A1* | 12/2016 | Roberts | G06F 3/0659 |
| 2018/0307264 | A1* | 10/2018 | Maciorowski | G06F 30/34 |
| 2018/0357065 | A1* | 12/2018 | Bhartia | G06F 9/3867 |
| 2019/0079775 | A1* | 3/2019 | Liland | G06F 9/3009 |
| 2019/0362802 | A1* | 11/2019 | Makwana | G11C 29/38 |
| 2020/0159581 | A1* | 5/2020 | Mirza | G06F 9/3873 |

OTHER PUBLICATIONS

Subramaniam, et al., "Criticality-Based Optimizations for Efficient Load Processing", HPCA 2009.
Calder, et al., "Selective Value Prediction", ISCA, Jun. 1999.
Fields, et al., "Focusing Processor Policies via Critical-Path Prediction", ISCA, Jun. 2001.
Tune, et al., "Dynamic Prediction of Critical Path Instructions", HPCA, Jan. 2001.
Salverda, et al., "A Criticality Analysis of Clustering in Superscalar Processors", Micro, Nov. 2005.
Baniasadi, et al., "Asymmetric-Frequency Clustering: A Power-Aware Back-end for High-Performance Processors", ISLPED, Aug. 2002.
Fields, et al., "Slack: Maximizing Performance Under Technological Constraints", ISCA, May 2002.
Seng, et al., "Reducing Power with Dynamic Critical Path Information", Micro, Dec. 2001.
Fisk, et al., "The Non-Critical Buffer: Using Load Latency Tolerance to Improve data Cache Efficiency", ICCD, Oct. 1999.
Kotra, et al., "Re-NUCA: A Practical NUCA Architecture for ReRAM based last-level caches", IPDPS, May 2016.

* cited by examiner

METHOD AND APPARATUS FOR REDUCING THE LATENCY OF LONG LATENCY MEMORY REQUESTS

BACKGROUND

Description of the Related Art

A variety of computing devices utilize heterogeneous integration, which integrates multiple types of integrated circuits for providing system functionality. The multiple functions are placed in a processing node and the multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for placing a processing node in system packaging to integrate the multiple types of integrated circuits. Some examples are a system-on-a-chip (SOC), multi-chip modules (MCMs) and a system-in-package (SiP).

Regardless of the choice for system packaging, in several uses, the performance of one or more computing systems can depend on a processing unit of one or more processing units of the system. Maintaining performance at relatively high levels typically requires quick access to stored data. Several types of data-intensive applications rely on quick access to data storage to provide reliable high-performance for several local and remote programs and their users. The memory hierarchy transitions from relatively fast, volatile memory, such as registers on a processor die and caches either located on the processor die or connected to the processor die, to non-volatile and relatively slow memory. The interfaces and access mechanisms for the different types of memory also changes. However, each access to the relatively slow memory adds significant latency to completing tasks.

In view of the above, efficient methods and mechanisms for efficiently processing memory requests are desired.

BRIEF DESCRIPTION OF THE DRAWINGS

The advantages of the methods and mechanisms described herein may be better understood by referring to the following description in conjunction with the accompanying drawings, in which.

Figure 1:
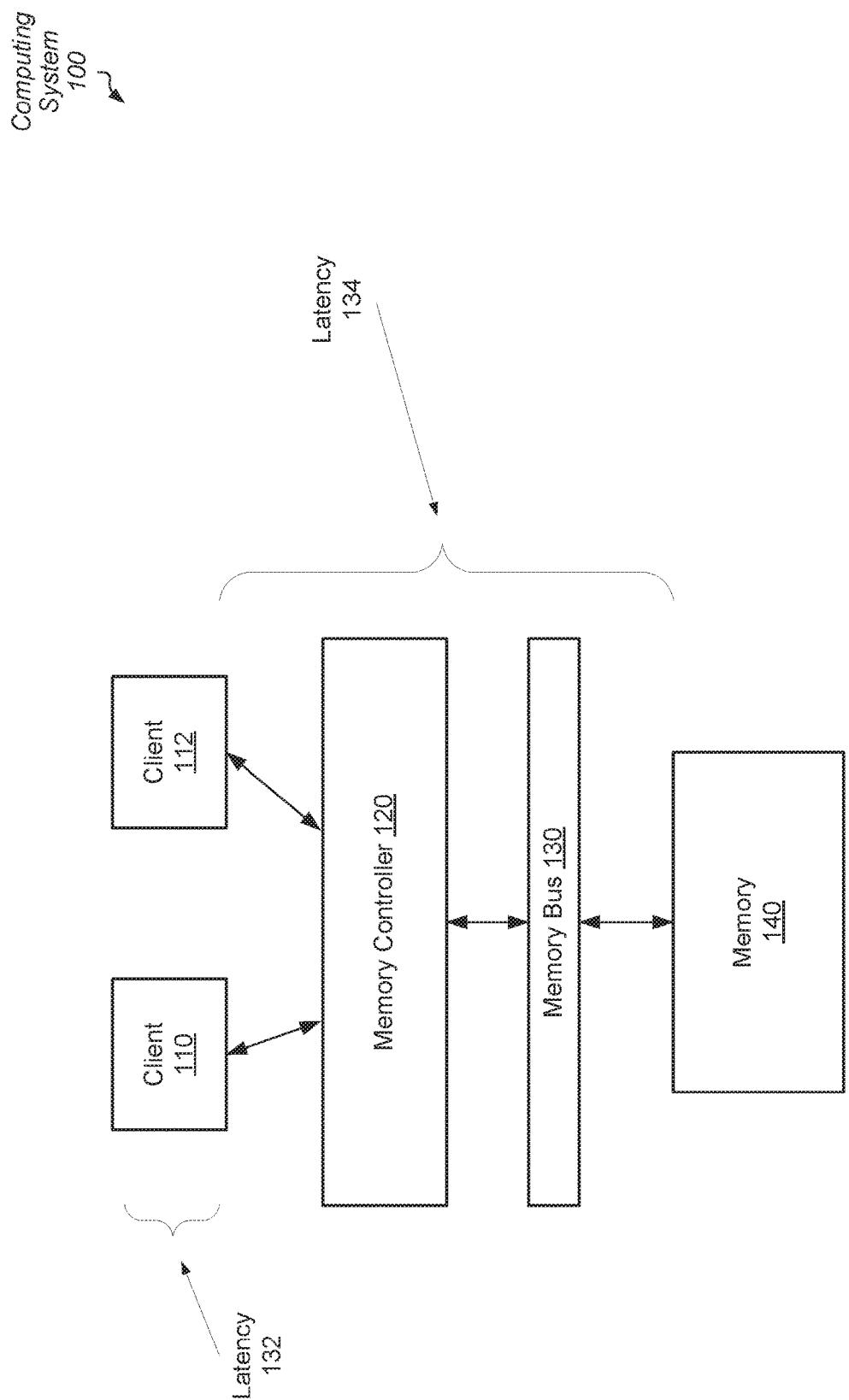
FIG. 1 is a block diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficiently processing memory requests are disclosed. In various embodiments, a computing system includes at least one processing unit coupled to a memory. Circuitry in the processing unit determines a memory request becomes a long-latency request based on detection of a condition of one or more conditions has occurred. Examples of the conditions (or events) are a translation lookaside buffer (TLB) miss whether the TLB is used for address mappings corresponding to stored instructions or address mappings corresponding to stored data, an instruction cache miss, a branch misprediction, a memory dependence misprediction, and a precise exception. Both the memory request that caused the condition (event) and subsequent memory requests have a significant wait latency before they retire. In order to reduce the wait latency, the circuitry of the processing unit marks one or more memory requests as a long-latency request. The one or more memory requests include at least the memory request that caused the condition (or event). In an embodiment, the processing unit marks one to N memory requests as long-latency requests. Here, N is a positive, non-zero integer. In various embodiments, the processing unit stores an indication of a long-latency request in an instruction tag of a memory request. In some embodiments, this indication in the tag of the memory request is a bit set to a particular value identifying the corresponding memory request as a long-latency request. In some cases, the particular value is a binary logic high value such as a power supply value. In other cases, the particular value is a binary logic low value such as a ground reference value. The indication is also used in tags of any read responses and any miss requests generated later and corresponding to the long-latency request.

When a memory request generates a page table walk due to a miss in a TLB, the circuitry of the processing unit marks this memory request as a long-latency request. This long-latency request remains in the load-store unit of a processor core while the TLB is updated with new virtual-to-physical address mappings. When the TLB update has completed, selection circuitry in the load-store unit prioritizes the memory request that is identified as a long-latency request over other in-flight (e.g., outstanding) memory requests not identified as long-latency requests. This long-latency request attempts a second time to access the TLB to obtain a physical address. After the page table walk and TLB updates, the second attempt should successfully provide a virtual-to-physical address mapping and access permissions from the TLB to the long-latency request. When the long-latency request uses the obtained physical address to access a cache, the long-latency request is also referred to as a replay memory request. When the long-latency request is a load request, it is also referred to as a replay load request. It is noted that the replay memory request may or may not be in a window of speculative execution, although the label "replay" is used to describe the memory request. It is possible that the long-latency request is in a window of speculative execution, but it is unnecessary. In some embodiments, a cache controller stores this outstanding long-latency request in a miss queue of the cache controller when the long-latency request misses in the data array of the cache. It is noted that the cache is a data cache or an instruction cache.

Circuitry of the processing unit for processing long-latency requests is distributed across a computing system such as among a load-store unit of a processor core, cache controllers, memory controllers, and routing circuitry in a communication fabric. The processing unit uses weighted criteria for scheduling out-of-order issue and servicing of memory requests. Examples of the criteria are quality-of-service (QoS) or other priority levels, ages of memory requests, sources of memory requests, and so forth. However, the indication of a long-latency request is not combined with the criteria in a weighted sum. Rather, the indication of the long-latency request is a separate value. The processing unit selects, for issue or servicing, a first memory request before a second memory request when the first memory request is identified as a long-latency request and the second memory request is not identified as a long-latency request.

Referring to FIG. 1, a generalized block diagram of one embodiment of a computing system 100 is shown. As shown, clients 110 and 112 send memory requests to memory 140 via a memory controller 120 and a memory bus 130. Memory 140 stores data accessed by clients 110 and 112. In various embodiments, memory 140 is used as system memory by clients 110 and 112. At least the data storage technology of memory 140 determines the access latency 134 of memory 140. A communication fabric, an input/output (I/O) interface for I/O devices and any links and interfaces for network connections are not shown in computing system 100 for ease of illustration. A determination of the latencies 132 within the clients 110 and 112 and the latency 134 is based on a number and depth of command and data queues, criteria selected to determine priority levels, a number of stages of arbitration logic, and so forth. As used herein, "arbitration logic" and "selection logic" refers to hardware circuits, such as circuitry, used to select one or more requests for issue. The arbitration logic and selection logic uses multiple stages of combinatorial logic implemented with hardware circuits. In some embodiments, the components of computing system 100 are individual dies on an integrated circuit (IC), such as a system-on-a-chip (SOC). In other embodiments, the components are individual dies in a system-in-package (SiP) or a multi-chip module (MCM).

In some embodiments, clients 110 and 112 include one or more of a central processing unit (CPU), a graphics processing unit (GPU), a hub for a multimedia engine, and so forth. Each of clients 110 and 112 is one of a variety of computing resources capable of processing applications and generating memory requests. Although a single memory controller 120 is shown, in other embodiments, computing system 100 uses two or more memory controllers. In various embodiments, memory controller 120 receives memory requests from clients 110 and 112, and schedules the memory requests, and issues the scheduled memory requests to memory 140. As used herein, "memory requests" are also referred to as "memory access requests," and "access requests." "Memory access requests" include "read access requests," "read requests," "load instructions," "write access requests," "write requests," "store instructions," and "snoop requests." It is noted that, in some embodiments, instructions are decoded into one or more micro-operations, or micro-ops. It is possible that the one or more micro-ops include one or more memory requests. These memory requests are not actually marked as a long-latency request until the memory request causes one of the examples provided earlier of a condition (event).

The clients 110 and 112 in addition to the memory controller 120 includes hardware circuits for scheduling memory requests. The circuitry schedules memory requests based on information such as quality-of-service (QoS) or other priority levels of the memory requests, process or software thread identifiers (IDs) of the memory requests, ages of the memory requests, an amount of time since a memory request had been issued to memory 140, and so forth. Therefore, the circuitry of clients 110 and 112 and memory controller 120 supports out-of-order issue of memory requests.

The memory controller 120 and memory 140 support a communication protocol for one or more memory channels between them. The communication protocol determines values used for information transfer such as a number of data transfers per clock cycle, signal voltage levels, signal timings, signal and clock phases and clock frequencies. In some embodiments, memory bus 130 supports sending data in a single direction for a given amount of time, such as during a given mode of the read mode and the write mode, and then sends data in the opposite direction for another given amount of time such as during the other mode of the read mode and the write mode. The communication protocol also contributes to the latency 134.

In an embodiment, memory 140 includes one of a variety of dynamic random access memory (DRAM), a variety of non-volatile (NV) dual in-line memory modules (DIMMs) such as NVDIMM-P, or another memory type providing another different access latency. For example, besides using types of random access memory (RAM) technologies and NVDIMM technologies, in some embodiments, memory 140 includes other examples of data storage technologies such as phase-change memories (PCM), ferroelectric memories (FeRAM), magnetoresistive memories (MRAM), resistive memories (ReRAM or RRAM), three dimensional (3D) cross-point (XPoint) memories, and so forth.

In some embodiments, the hardware circuits of memory controller 120 translates each received memory request to one or more commands. The memory controller 120 determines whether commands can be issued without causing a data collision on the memory data bus 130. For example, based on the point in time for issuing a selected command and the access latency 134, memory controller 120 keeps track of points in time when data is scheduled to arrive on the shared memory data bus 130. In some embodiments, points in time are measured by clock cycles.

As described earlier, circuitry that performs arbitration among commands to issue uses weighted criteria, and the criteria includes quality-of-service (QoS) or other priority levels, ages of memory requests, sources of memory requests, and so forth. In various embodiments, one of the clients 110 and 112 stores an indication of a long latency with a given memory request. For example, the tag of the given memory request is updated with an indication of a long-latency request. This given memory request is also referred to as a "long-latency request." Circuitry used for arbitration and scheduling of micro-ops in one or more of the clients 110 and 112, the memory controller 120, and a communication fabric (not shown) provides a highest priority to long-latency requests. As the long-latency request traverses from the processor core to system memory or to another processor across a network, distributed circuitry in intermediate queues and routing logic prioritize the long-latency requests over memory requests not identified as a long-latency request.

In an embodiment, the indication of a long-latency request is not combined with other criteria in a weighted sum. Rather, the indication of the long-latency request is a separate value. Therefore, circuitry selects, for issue or servicing, a first memory request before a second memory request when the first memory request includes the indication of a long-latency request. In one case, the second memory request has a higher priority level determined from weighted criteria. In one example, the first memory request has a priority level of 16 based on weighted criteria and the second memory request has a priority level of 82 based on weighted criteria. However, the circuitry selects the first memory request before the second memory request for issue or servicing based on the first memory request being identified as a long-latency request.

In some embodiments, the clients 110 and 112 add the indication of a long latency request to a tag of a given memory request when execution of the given memory request generates a page table walk. For example, during execution of the given memory request, an access of a translation lookaside buffer (TLB) provides an indication of a miss. In an embodiment, the next N memory requests in program order younger than the given memory request also have a corresponding tag updated with an indication of a long latency request. The value N is a non-zero integer stored in a programmable configuration register. The clients 110 and 112 determine a memory request is a long-latency request based on other additional conditions as further described in the following discussion.

Figure 2:
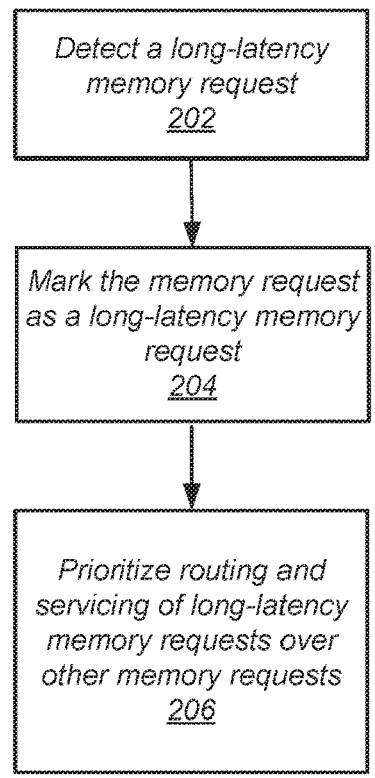
FIG. 2 is a flow diagram of one embodiment of a method for scheduling memory requests.

Referring now to FIG. 2, one embodiment of a method 200 for scheduling memory requests is shown. For purposes of discussion, the steps in this embodiment (as well as in FIGS. 4-5 and 7-8) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 200.

A client of one or more clients in a computing system executes software applications. During execution of instructions of the software applications, the client executes memory requests. During instruction execution, the client detects a long-latency memory request (block 202). In one case, during execution of a given memory request, an access of a translation lookaside buffer (TLB) provides an indication of a miss, since the requested virtual-to-physical address mapping is not resident in the TLB. Accordingly, the client determines that the given memory request generates a page table walk, and the client has detected the given memory request as a long-latency request. In various embodiments, the address space for memory coupled to the client includes a virtual address space. This virtual address space is partitioned into a particular page size with virtual pages mapped to physical memory frames. These virtual-to-physical address mappings are stored in a page table in the memory. The client obtains, after a page table walk, a copy of a portion of the physical addresses stored in the page table, and stores the copy with associated virtual addresses as mappings in one or more TLBs. These one or more TLBs are associated with one or more levels of a cache memory hierarchy. These one or more TLBs are associated with instruction address mappings or data address mappings.

The client marks the given memory request as a long-latency memory request (block 204). Therefore, the memory request is identified as a long-latency request. For example, the client adds an indication of a long-latency request to a tag of the given memory request. In some embodiments, the next N memory requests in program order younger than the given memory request also have a corresponding tag updated with an indication of a long-latency request. The value N is a non-zero, positive integer stored in a programmable configuration register. In other embodiments, the client adds the indication of a long-latency request to memory requests within the next N instructions in program order younger than the given memory request.

The client prioritizes routing and servicing of long-latency memory requests over other memory requests that are not marked as long-latency requests (block 206). Therefore, the client prioritizes routing and servicing of memory requests identified as long-latency requests over other outstanding memory requests that are not identified as long-latency requests. For example, scheduling hardware circuits of the client marks, for issue, memory requests identified as long-latency requests before marking, for issue, other outstanding memory requests that are not identified as long-latency requests. As described earlier, in some embodiments, the indication of a long-latency request is not combined with other criteria in a weighted sum when selecting memory requests to issue and service. Rather, the indication of the long-latency request is a separate value. Therefore, selection circuitry selects, for issue or servicing, a first memory request before a second memory request when the first memory request includes the indication of a long-latency request and the second memory request does not include such an indication. The second memory request may have a greater value for a weight sum of criteria, but the first memory request still has higher priority due to the indication of a long-latency request. When each of the first memory request and the second memory request is a long-latency request, the selection circuitry relies on the weighted sum to determine which memory request to issue or service first.

Selection circuitry in the client determines a memory request becomes a long-latency request based on one of multiple conditions has occurred. Examples of the conditions (or events) are a translation lookaside buffer (TLB) miss whether the TLB stores address mappings for instructions or address mappings for data, a branch misprediction, a memory dependence misprediction, an instruction cache miss, and a precise exception. These conditions or events cause subsequent instructions to have a significant wait latency to retire. In many cases, these subsequent instructions include one or more additional memory requests. In some cases, the subsequent instructions include instructions of a current instruction sequence already fetched and being processed in a pipeline before the detected condition (event). In other cases, the subsequent instructions are instructions of an alternate instruction sequence fetched after the detected condition (event). Examples of conditions that cause fetching of an alternate instruction sequence are a branch misprediction and an instruction cache miss. For a memory dependence misprediction, instructions are fetched after the condition is detected, but the instructions are the same instructions previously fetched. For some conditions, such as branch mispredicton and memory dependence misprediction, the processor pipeline is flushed prior to fetching subsequent instructions.

Regardless of the condition (event), in order to reduce the wait latency, hardware circuits of the client marks at least the memory request that caused the condition (event) as a long-latency request. In some embodiments, the client adds the indication of a long-latency request to tags of one or more memory requests younger in-program-order than the memory request that caused the condition (event). For example, the client adds the indication of a long-latency request to tags of one to N memory requests in-program-order beginning with the memory request that caused the condition (event). Here, N is a positive, non-zero integer. In some embodiments, the value N is stored in a programmable configuration register. In various embodiments, when executing instructions after detection of one of the above conditions (events), the client adds the indication of a long-latency request to the tags of the first one to N memory requests that miss in the data cache, but do not already include the indication of a long-latency request. In other cases, the client adds the indication of a long-latency request to the tags of memory requests that miss in the data cache when the memory requests are within the first N instructions after detection of one of the above conditions (events), but do not already include the indication of a long-latency request.

Figure 3:
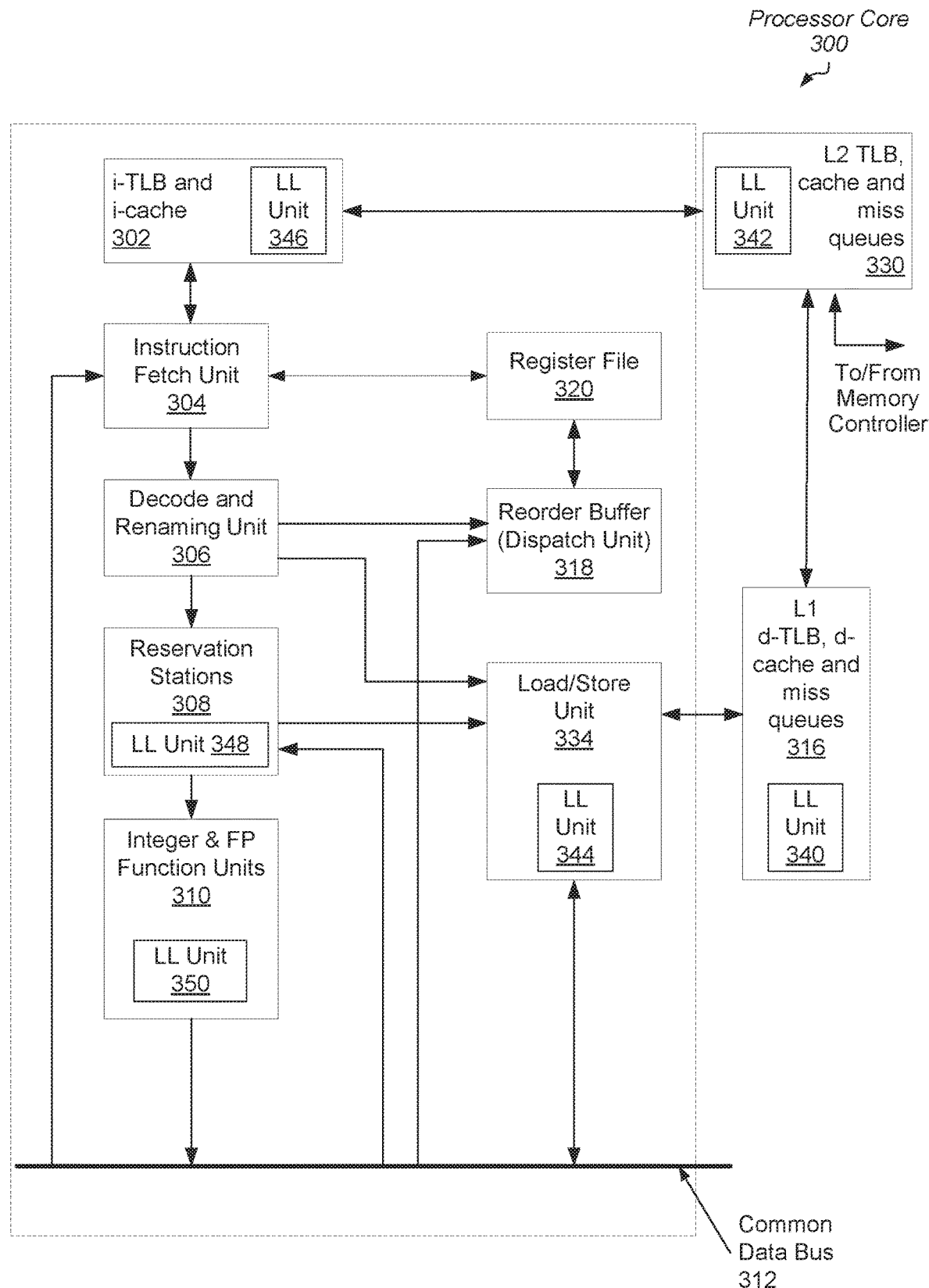
FIG. 3 is a block diagram of one embodiment of a general-purpose processor core.

Referring to FIG. 3, one embodiment of a general-purpose processor core 300 that performs out-of-order execution is shown. In one embodiment, processor core 300 simultaneously processes two or more threads in a client that is a general-purpose CPU such as one of clients 110 and 112 (of FIG. 1). The functionality of processor core 300 is implemented by one or more of hardware, such as circuitry, and software such as firmware. An instruction-cache (i-cache) of block 302 stores instructions for a software application and a corresponding instruction translation-lookaside-buffer (TLB) of block 302 stores virtual-to-physical address mappings needed to access the instructions. In some embodiments, the instruction TLB (i-TLB) also stores access permissions corresponding to the address mappings.

The long-latency (LL) unit 346 detects when a given instruction request accesses the instruction TLB and the access results in a miss. When the LL unit 346 detects the miss result, the LL unit 346 adds an indication of long latency to the instruction sequence fetched into the instruction cache 302 and the instruction fetch unit (IFU) 304 after the access is serviced. The long latency indication is then passed to the decode and renaming unit 306, which decodes the instruction sequence. In some embodiments, the decode and renaming unit 306 decodes each received instruction into one or more micro-operations, or micro-ops. The decode and renaming unit 306 adds an indication of long latency to at least the first memory instruction detected in the received instruction sequence. The indication of long latency is then passed from the first memory instruction to a tag of a given memory request corresponding to the first memory instruction. It is noted that it is possible that the decode and renaming unit 306 generates one or more memory requests when decoding a single fetched instruction. For example, the one or more memory requests may be a subset of one or more micro-ops generated from a single fetched instruction. It is also noted that unit 306 is capable of generating one or more memory requests from a single fetched instruction that is not a memory access instruction.

Therefore, in some embodiments, memory requests are micro-ops generated from fetched instructions. In other embodiments, the instructions are not decoded into one or more micro-ops, and a memory request is a memory access instruction. These memory requests include load requests for data, load requests or fetch requests for instructions, store requests for updating a copy of data, snoop requests, and both read commands and write commands generated from memory requests that are sent from a cache controller to a memory controller.

Each of the one or more generated memory requests has a corresponding tag updated with an indication of a long-latency request when the corresponding instruction includes an indication of long latency. In some cases, the load/store unit (LSU) performs such an update later for memory requests based on other detected conditions such as a TLB miss in block 316. As described earlier, in some embodiments, the next N memory requests in program order younger than the given memory request from the same source (thread) that caused a long-latency event also have a corresponding tag updated by the LL unit 346 with an indication of a long-latency request. The value N is a non-zero, positive integer stored in a programmable configuration register that is accessed by the LL unit 346.

A page table walk follows the miss of the instruction TLB so that the instruction TLB has page table entries updated with new address mappings and access permissions. The instruction fetch unit (IFU) 304 fetches multiple instructions from the instruction cache 302 per clock cycle if there are no misses in the instruction cache or the instruction TLB of block 302. The IFU 304 includes a program counter that holds a pointer to an address of the next instructions to fetch from the instruction cache 302, which is compared to address mappings in the instruction TLB. The IFU 304 also includes a branch prediction unit (not shown) to predict an outcome of a conditional instruction prior to an execution unit determining the actual outcome in a later pipeline stage.

The decoder unit 306 decodes the opcodes of the multiple fetched instructions and allocates entries in an in-order retirement queue, such as reorder buffer 318, in reservation stations 308, and in a load/store unit 334. In some embodiments, the decode unit 306 also performs register renaming of instruction operands to remove write-after-read (WAR) and write-after-write (WAW) hazards. In other embodiments, the reorder buffer 318 performs register renaming. When read-after-write (RAW) hazards are removed for instructions, the instructions are allocated in the reservation stations 308.

The reservation stations 308 act as an instruction queue where instructions wait until their operands become available. When operands are available and hardware resources are also available, the logic of the reservations stations 308 issue an instruction out-of-order to the integer and floating-point functional units 310 or to the load/store unit 334. In some embodiments, the decode unit 306 includes long-latency (LL) logic (not shown) and the reservation stations 308 include LL unit 348 that marks memory requests as long-latency requests that were fetched after a miss in the instruction TLB. For example, when the IFU 304 sends a load operation, such as a fetch request, to the block 302, and the fetch request misses in the instruction cache, the page table walk is executed. After completion of the page table walk, the requested cache line storing one or more instructions is fetched from the instruction cache.

Additionally, the next N memory requests generated from one or more instructions fetched from the instruction cache are marked as long-latency requests by one of the decode unit 306 and the reservation stations 308. In one embodiment, the value N is a non-zero integer stored in a programmable configuration register. The decode unit 306 determines the instruction types of the fetched instructions using at least the opcodes of the fetched instructions. In another embodiment, rather than use N as a limit, the limit of a number of memory requests to mark as a long-latency request is set by a number of cache lines or a number of fetched bytes. These values are stored in programmable configuration registers. Therefore, when the limit is a single cache line, any memory requests detected in the first cache line fetched from the instruction cache after a page table walk are marked as long-latency requests.

The functional units 310 include arithmetic logic units (ALU's) for computational calculations such as addition, subtraction, multiplication, division, and square root. Logic may be included to determine an outcome of a conditional instruction such as a branch instruction. The logic compares a branch outcome predicted in the IFU 304 to a branch outcome determined in the functional units 310. A match indicates a correct branch prediction and information in the branch predictor of the IFU 304 may be updated to strengthen the prediction. A mismatch indicates a branch misprediction and information in the branch predictor of the IFU 304 may be updated to weaken the prediction.

In addition, when logic detects a branch misprediction, the LL unit 350 marks a particular memory request as a long-latency request before sending the particular memory request to the IFU 304 to fetch instructions of a correct sequence of instructions. The particular memory request includes an address pointing to a memory location storing a first instruction of the correct sequence of instructions. In another embodiment, when information is received from the functional units 310 indicating branch misprediction, the LL unit 350 marks the memory request as a long-latency request within the IFU 304. The decode unit 306 includes long-latency (LL) logic (not shown) and the reservation stations 308 include LL unit 348 that marks load requests as long-latency requests that were fetched after a branch misprediction. As described earlier, the limit of a number of memory requests to mark as long-latency requests after a branch misprediction is set by one of a number N, a number of fetched cache lines, and a number of fetched instruction bytes.

The load/store unit (LSU) 334 receives memory requests, such as load and store operations, from one or more of decode unit 306 and the reservation stations 308. The load/store unit 334 includes queues and logic to execute memory requests. In an embodiment, the load/store unit 334 includes verification logic to ensure a load instruction receives forwarded data from the correct youngest store instruction. The load/store unit 334 issues memory requests to the level-one (L1) data cache (d-cache) of block 316 on the chip. Each of the LL unit 344 of the LSU 334 and the LL unit 340 of the L1 cache 316 prioritizes long-latency requests over memory requests not marked as long-latency requests. For example, the LL unit 344 and the LL unit 340 includes arbitration logic and scheduling logic that provides a highest priority to long-latency requests. The indication of a long-latency request is not combined with other criteria in a weighted sum. For other memory requests, the LSU 334 logic and the LL unit 340 uses weighted criteria, and the criteria includes quality-of-service (QoS) or other priority levels, ages of memory requests, sources of memory requests, and so forth.

The indication of the long-latency request is a separate value from the weighted criteria. Therefore, the LSU 334 selects, for issue to the L1 cache 316, a first memory request before a second memory request when the first memory request is marked as a long-latency request and the second memory request is not marked as a long-latency request. In one case, the second memory request has a higher priority level determined from weighted criteria. The first memory request has a priority level of 16 based on weighted criteria and the second memory request has a priority level of 82 based on weighted criteria. However, the LSU 334 selects the first memory request before the second memory request for issue to the L1 cache 316 based on the first memory request being marked as a long-latency request. The LL unit 340 selects memory requests to search a data cache in a similar manner as the LL unit 344 selects memory requests.

Similar to the LL unit 346, the LL unit 340 detects when a given memory request accesses the data TLB and the access results in a miss. When the LL unit 340 detects the miss result, the LL unit 340 adds an indication of a long-latency request to a tag of the given memory request such as a load (read) request. As described earlier, in some embodiments, the next N memory requests in program order younger than the given memory request from the same source (thread) also have a corresponding tag updated by the LL unit 340 with an indication of a long-latency request. The value N is a non-zero integer stored in a programmable configuration register that is accessed by the LL unit 340.

A page table walk follows the miss of the data TLB so that the data TLB has page table entries updated with new address mappings and access permissions. The L1 cache 316 prioritizes memory requests marked by the LL unit 340 as long-latency requests over other memory requests not marked as long-latency requests even when other memory requests have a higher priority level based on weighted criteria. For example, the L1 cache 316 is capable of servicing memory requests for multiple threads. The marking of a long-latency request is not combined with other criteria in a weighted sum.

In some embodiments, the core 300 also includes a level-two (L2) cache 330 for servicing memory requests from the L1 data cache 316 and the L1 instruction cache 302. The TLB of the block 330 services address mapping requests from the instruction TLB of block 302 and the data TLB of block 316. If a requested memory line is not found in the L1 data cache of block 316 or a requested memory line is not found in the instruction cache of block 302, then the corresponding cache controller sends a miss request to the L2 cache of block 330. Similarly, if a requested address mapping is not found in the L1 instruction TLB of block 302 or a requested address mapping is not found in the L1 data TLB of block 316, then the corresponding cache controller sends a miss request to the L2 TLB of block 330. Any of these miss requests is also marked as a long-latency request when the corresponding memory request is already marked as a long-latency request. The corresponding memory request is already marked as a long-latency request due to a detected condition (event). As described earlier, examples of the condition are a miss in the data TLB, an earlier branch misprediction, a miss in the instruction cache, and an earlier miss in the instruction TLB.

When the requested memory line is not found in the L2 cache 330, then the L2 cache controller sends a miss request to access memory in lower level memory such as a level-three (L3) cache or system memory. This miss request sent from the L2 cache controller is also marked as a long-latency request when the corresponding miss request received by the L2 cache controller is already marked as a long-latency request. The miss request sent from the L2 cache controller is also marked as a long-latency request when the received miss request missed in the L2 TLB, which initiated a page table walk.

In various embodiments, the core 300 and other external cores share the lower level memory. The wait for the requested memory line to arrive from lower level memory typically requires a substantial number of clock cycles. To reduce performance degradation from this wait, in some embodiments, one or more of the L1 cache controller and the L2 cache controller generates one or more prefetch requests for one or more miss requests. The cache controllers generate prefetch requests after monitoring a number of demand memory accesses within an address range. In some embodiments, the processor core 300 supports marking prefetch requests as long-latency requests if the demand requests used to train the prefetcher are also marked as long-latency requests. In other embodiments, the processor core supports marking demand requests as long-latency requests and not marking prefetch requests as long-latency requests.

The functional units 310 and the load/store unit 334 present results on a common data bus 312. The reorder buffer 318 receives results from the common data bus 312. In one embodiment, the reorder buffer 318 is a first-in first-out (FIFO) queue that ensures in-order retirement of instructions according to program order. Here, an instruction that receives its results is marked for retirement. If the instruction is head-of-the-queue, logic of the reorder buffer 318 sends its results to the register file 320. The register file 320 holds the architectural state of the general-purpose registers of processor core 300. Then the instruction in the reorder buffer 318 retires in-order and logic updates its head-of-queue pointer to point to the subsequent instruction in program order.

The results on the common data bus 312 are also sent to the reservation stations 308 in order to forward values to operands of instructions waiting for the results. When these waiting instructions have values for their operands and hardware resources are available to execute the instructions, they may be issued out-of-order from the reservation stations 308 to the appropriate resources in the functional units 310 or the load/store unit 334. Uncommitted, or non-retired, memory access instructions have entries in the load/store unit. The forwarded data value for an in-flight, or uncommitted, load instruction from the youngest uncommitted older store instruction is placed on the common data bus 312 or simply routed to the appropriate entry in a load buffer within the load/store unit 334. Multiple threads share multiple resources within core 300. For example, these multiple threads share each of the blocks 302-330 shown in FIG. 3.

Figure 4:
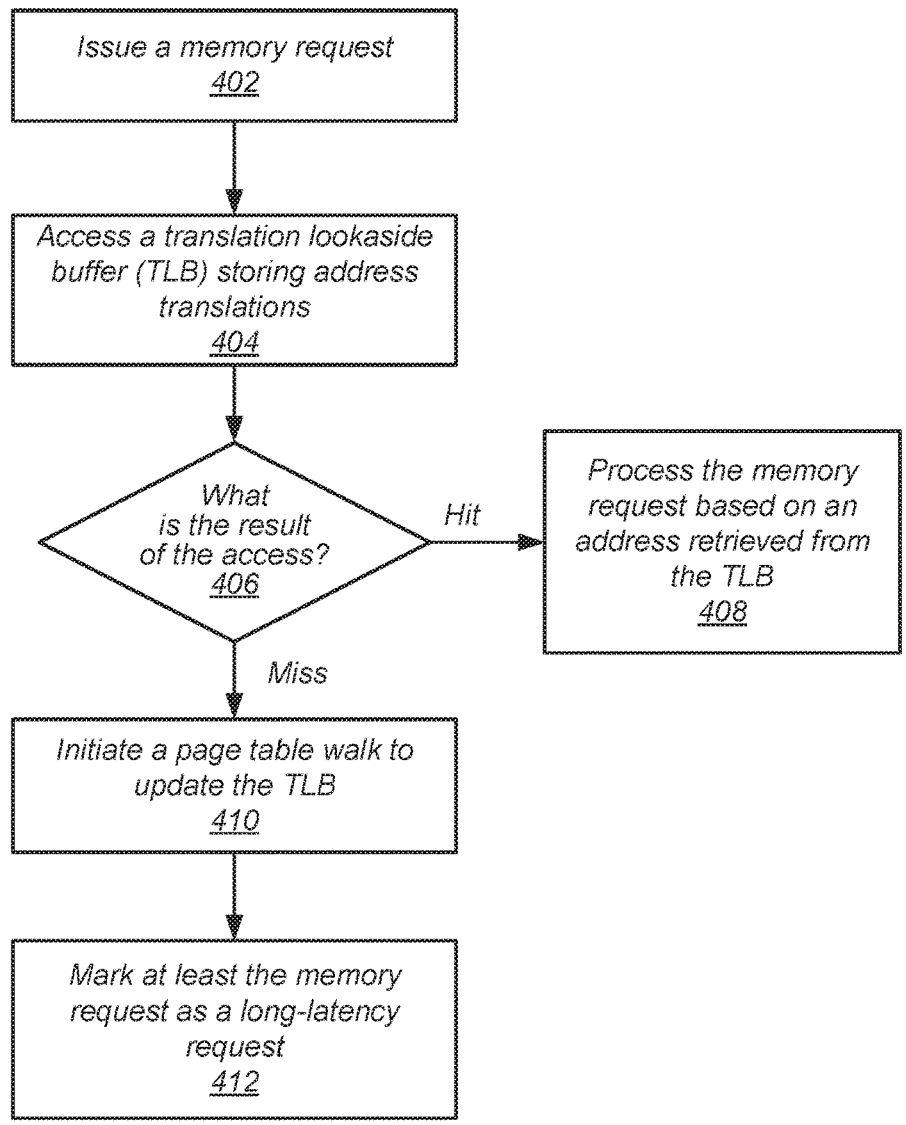
FIG. 4 is a flow diagram of one embodiment of a method for marking memory requests.

Turning now to FIG. 4, one embodiment of a method 400 for marking memory requests as long-latency requests is shown. Memory requests are stored in one or more queues. Hardware circuits assign priority levels to the memory requests based on weighted criteria as described earlier. Selection circuitry selects a memory request to issue based on the priority levels. The selection circuitry issues a memory request (block 402). To process the memory request, the selection circuitry of a load-store unit, or other, accesses a cache storing address translations (block 404). For example, a translation lookaside buffer (TLB) stores virtual-to-physical addresses in addition to access permissions.

An issued memory request accesses the TLB to obtain a corresponding physical address. If the access results in a hit ("hit" branch of the conditional block 406), then logic of the cache controller processes the memory request based on an address retrieved from the TLB (block 408). In various embodiments, this logic of the cache controller uses hardware circuits, such as circuitry, for determining whether to mark requests as long-latency requests and for performing the marking of the requests. For example, logic accesses a tag array using the obtained physical address in order to search for requested data possibly stored in a data array. If the access results in a miss ("miss" branch of the conditional block 406), then logic initiates a page table walk to update the TLB (block 410). Logic also marks at least the memory request that caused the page table walk as a long-latency request (block 412). For example, logic stores an indication of the long-latency request in a tag corresponding to the memory request.

In some embodiments, the logic of the cache controller marks one or more memory requests as long-latency requests in addition to the memory request that caused the long-latency event such as a page table walk. In one case, the particular memory request that caused the page table walk requests data from a data cache. When the page table walk is initiated, the next N memory requests younger (in program order) than the particular memory request from the same source (thread) have a corresponding tag updated. The tag is updated with an indication of a long-latency request. The value N is a non-zero integer stored in a programmable configuration register. In another case, the particular memory request that caused the page table walk and subsequent memory requests request instructions from an instruction cache. In this case, when the page table walk has completed and a cache line storing instructions has been retrieved from the instruction cache, in some embodiments, the retrieved instructions are decoded into micro-ops. Therefore, a memory request is either a micro-op generated from an instruction retrieved from the instruction cache or a memory access instruction retrieved from the instruction cache. Whether or not micro-ops are used, a memory request of a limit of the next N memory requests is marked as a long-latency request. In other cases, each memory request in the first N cache lines fetched from the instruction cache by a memory request that is marked as a long-latency request are also marked as long-latency requests. Other possibilities for marking additional memory requests as long-latency requests are also contemplated.

Figure 5:
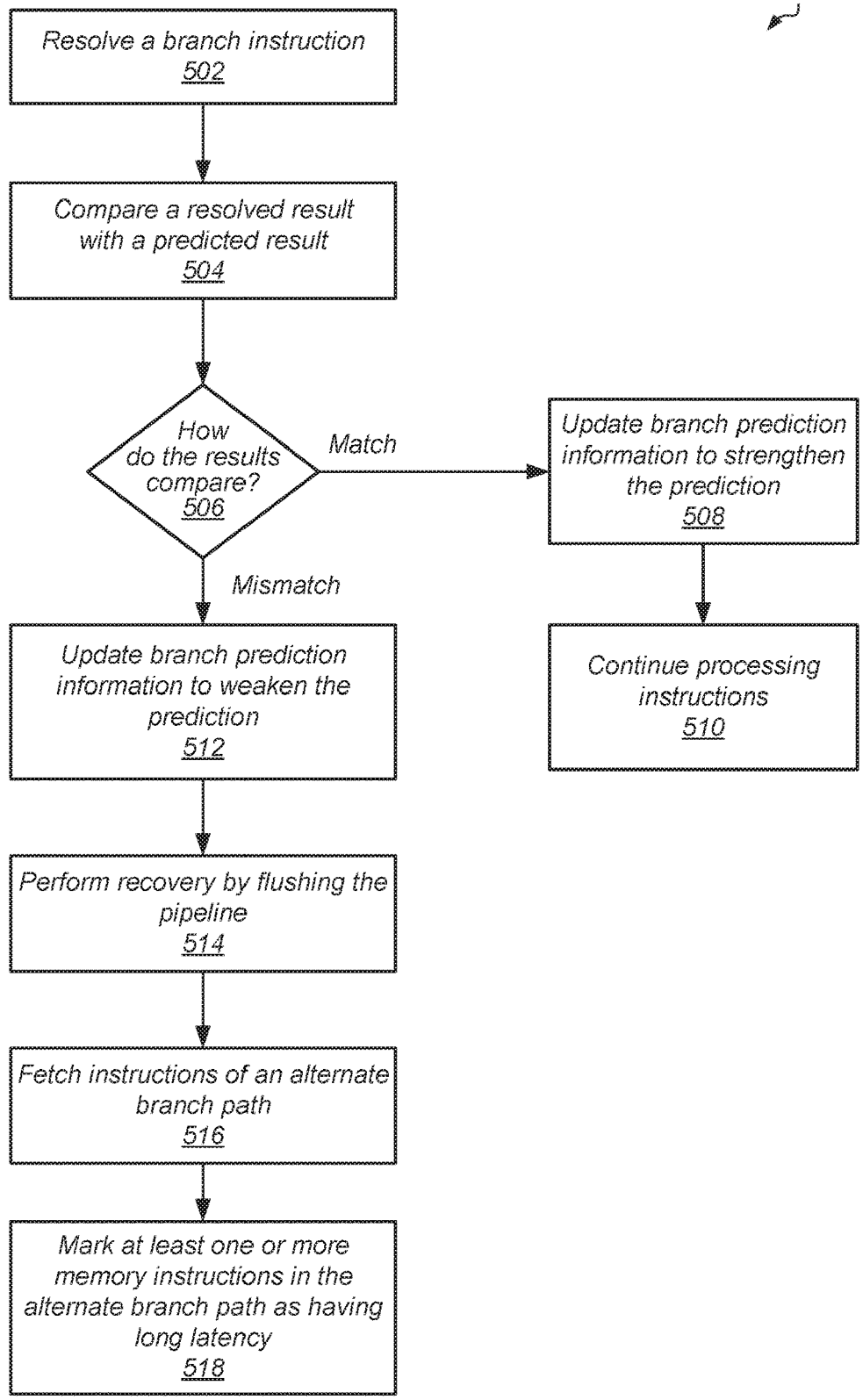
FIG. 5 is a flow diagram of one embodiment of a method for marking memory requests.

Turning now to FIG. 5, one embodiment of a method 500 for marking memory requests as long-latency requests is shown. Hardware circuits resolve a branch instruction or operation (block 502). In some embodiments, the hardware circuits are in an execution unit and determine an outcome of a conditional branch instruction or operation. The hardware circuits compare a resolved result with a predicted result (block 504). The hardware circuits compare a branch outcome predicted in an instruction fetch unit to a branch outcome determined in the functional unit. If the comparison is a match ("match" branch of the conditional block 506), then the hardware circuits update branch prediction information to strengthen the prediction (block 508). The hardware circuits continues processing instructions (block 510).

If the comparison is a mismatch ("mismatch" branch of the conditional block 506), then the hardware circuits update branch prediction information to weaken the prediction (block 512). The hardware circuits perform recovery by flushing the pipeline (block 514). The logic of an instruction fetch unit, using circuitry, fetches instructions of an alternate branch path (block 516). The logic fetches instructions of the alternate path from an instruction cache using a program counter updated by the branch resolution. The logic marks at least one or more retrieved instructions in the alternate branch path as having long latency (block 518). As described earlier regarding the decode unit 306, in some embodiments, a single instruction is decoded into one or more micro-ops. It is possible that the one or more micro-ops include one or more memory requests. In other embodiments, the decode unit does not decode instructions into micro-ops. Therefore, a memory request is either a micro-op generated from an instruction retrieved from the instruction cache or a memory access instruction retrieved from the instruction cache. These memory requests are not actually marked as a long-latency request until a corresponding instruction, which is marked as having long latency, is decoded, or the memory request later causes one of the examples provided earlier of a long-latency condition (event). In an embodiment, a limit of N memory requests of an alternate path of instructions retrieved from the instruction cache after a mispredicted branch operation is resolved are marked as long-latency requests. In yet other cases, each memory request in the first fetched N cache lines of the alternate path of instructions retrieved from the instruction cache is marked as a long-latency request. Other possibilities for marking additional memory requests as long-latency requests are also contemplated.

Figure 6:
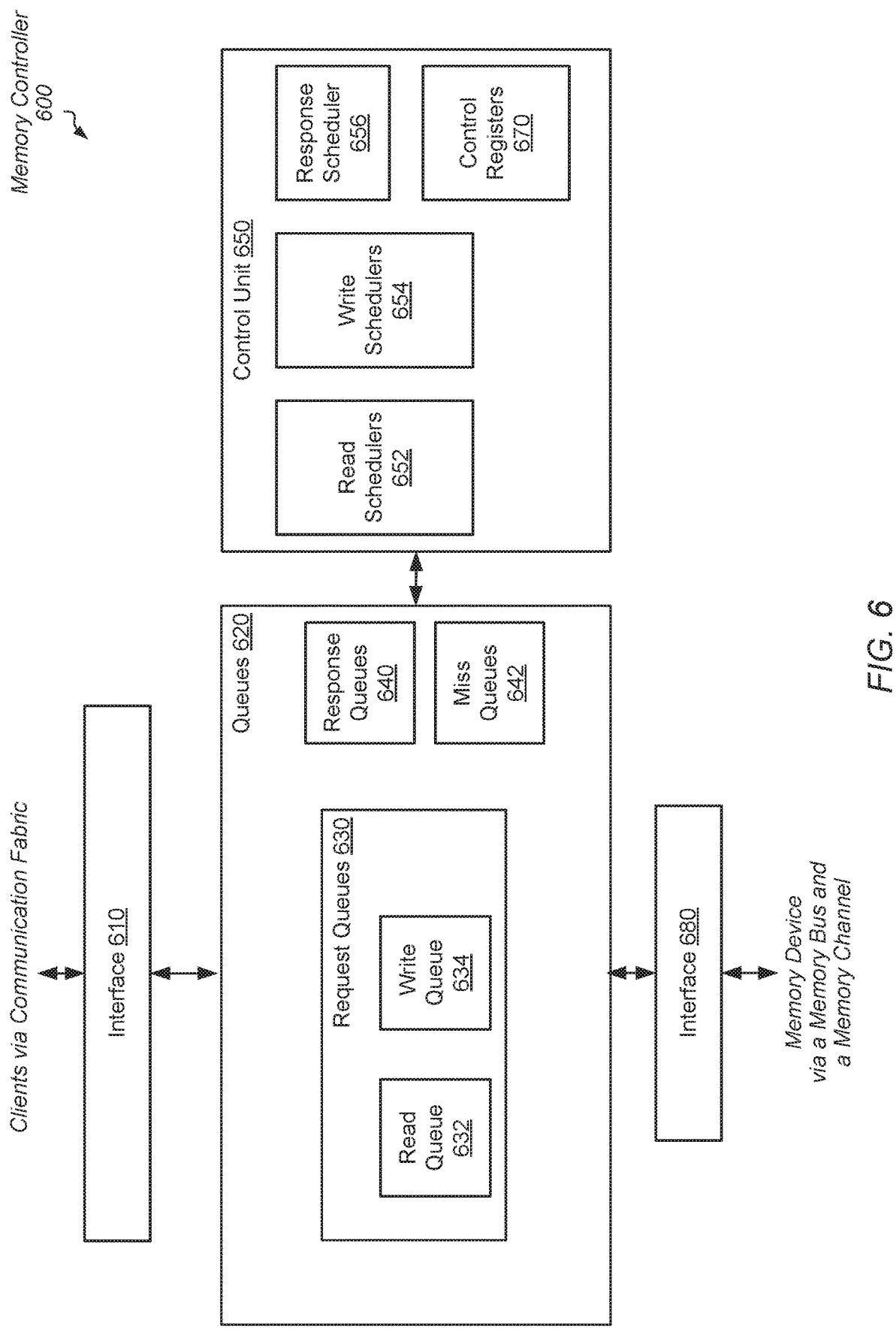
FIG. 6 is a block diagram of one embodiment of a memory controller.

Referring to FIG. 6, a generalized block diagram of one embodiment of a memory controller 600 is shown. Although memory controller 600 is described as a controller interfacing with a memory device used as system memory, many of the features of the memory controller 600 are also used in cache controllers interfacing with a cache memory in a hierarchical memory subsystem. In the illustrated embodiment, memory controller 600 includes an interface 610 to clients via a communication fabric, queues 620 for storing received memory access requests and received responses, control unit 650 and an interface 680 to a memory device. Each of interfaces 610, and 680 supports a communication protocol.

In an embodiment, interface 680 is an interface to a memory command bus for sending memory access commands corresponding to memory requests received via interface 610 to a memory device. In the illustrated embodiment, queues 620 includes request queues 630, response queues 640, and miss queues 642. In an embodiment, queues 620 include a read queue 632. In addition, queues 620 includes a write queue 634 for storing received write requests. In some embodiments, queues 620 also includes miss queues 642 when the memory includes a data storage technology that provides a miss status as a response to an access. In an embodiment, one of the first memory type and the second memory type is NVDIMM-P, which provides the miss status response. In an implementation where the controller 600 is a cache controller, the miss queues 642 store memory requests that miss in one or more of a TLB and a data array.

In some embodiments, the control unit 650 uses read schedulers 652, which include arbitration logic for selecting read requests from the read queue 632 out-of-order. In an embodiment, read schedulers 652 select a request from the read queue 632 when a respective request is available for scheduling in a given clock cycle from the read queue 632. In some embodiments, read schedulers 652 schedule read requests for out-of-order issue based on weighted criteria and the criteria includes one or more of quality-of-service (QoS) or other priority information, age, a process or thread identifier (ID), and a relationship with other stored requests such as targeting a same memory channel, targeting a same rank, targeting a same bank and/or targeting a same page. In various embodiments, the read schedulers 652 provide a highest priority to read requests marked as long-latency requests. In an embodiment, the indication of a long-latency request is not combined with other criteria in a weighted sum. Rather, the indication of the long-latency request is a separate value. Therefore, the read schedulers 652 select for issue a first read request before a second read request when the first read request includes the indication of a long-latency request and the second read request does not include such an indication.

To avoid data collisions on the memory data bus, the read schedulers 652 determine a next given point in time that the memory data bus is available. In some embodiments, points in time are measured by clock cycles. Read schedulers 652 determine whether there is sufficient time to schedule a first memory access command corresponding to a selected read request stored in the read queue 632 to provide response data at the given point in time. In other words, read schedulers 652 determine whether a new memory access command received by the read queue 632 can be scheduled for issue to either the first memory device or the second memory device such that a response to the new memory access command will be received on the memory data bus at the given point in time. In various embodiments, the given point in time is a next available point in time in which the memory data bus is not scheduled to have data driven on the memory data bus and has not yet been considered for scheduling.

Responses are returned after a deterministic latency with an indication specifying whether valid data is included in the responses. If valid data is not included in the response, a retry is attempted later. Therefore, the memory access command is stored in miss queues 642 for a later retry. Write schedulers 654 include similar selection logic for the write queue 634 as used by the read schedulers 652. For example, weighted criteria and an indication of a long-latency request are used for selecting requests to issue. In various embodiments, write schedulers 654 also consider data collisions caused by data driven on the shared memory data bus.

In an embodiment, response scheduler 656 includes similar logic for issuing, based on priorities, responses out-of-order to clients. Response scheduler 656 includes similar selection logic as used by the read schedulers 652 and the write schedulers 654. For example, weighted criteria and an indication of a long-latency request are used for selecting responses to issue. In some embodiments, the received response data includes a tag or other identifier that the response scheduler 656 uses to identify which command stored in the read queue 632 is associated with the response data. In other embodiments, the timing of the arrival of the request data on the memory data bus is used by response scheduler 656 to identify which command is associated with the response data. Therefore, although the request data arrives out-of-order corresponding to the issue of commands, the response scheduler 656 is able to keep track of which received data belongs with which command.

In some embodiments, control registers 670 store an indication of a current mode. For example, the off-chip memory data bus and memory device support either a read mode or a write mode at a given time. Therefore, traffic is routed in a given single direction during the current mode and changes direction when the current mode is changed after a data bus turnaround latency. In various embodiments, control registers 670 store a threshold number of read requests (read burst length) to send during the read mode. In some embodiments, control registers 670 include programmable configuration registers that store weights for criteria used by selection algorithms in read schedulers 652, write schedulers 654 and response scheduler 656 for selecting information stored in queues 632-642 to issue. In an implementation where the controller 600 is used as a cache controller, the control registers 670 also store a number N of memory requests to mark as long-latency requests after a TLB miss, an instruction cache miss, a branch misprediction, a memory dependence misprediction, or a precise exception.

Figure 7:
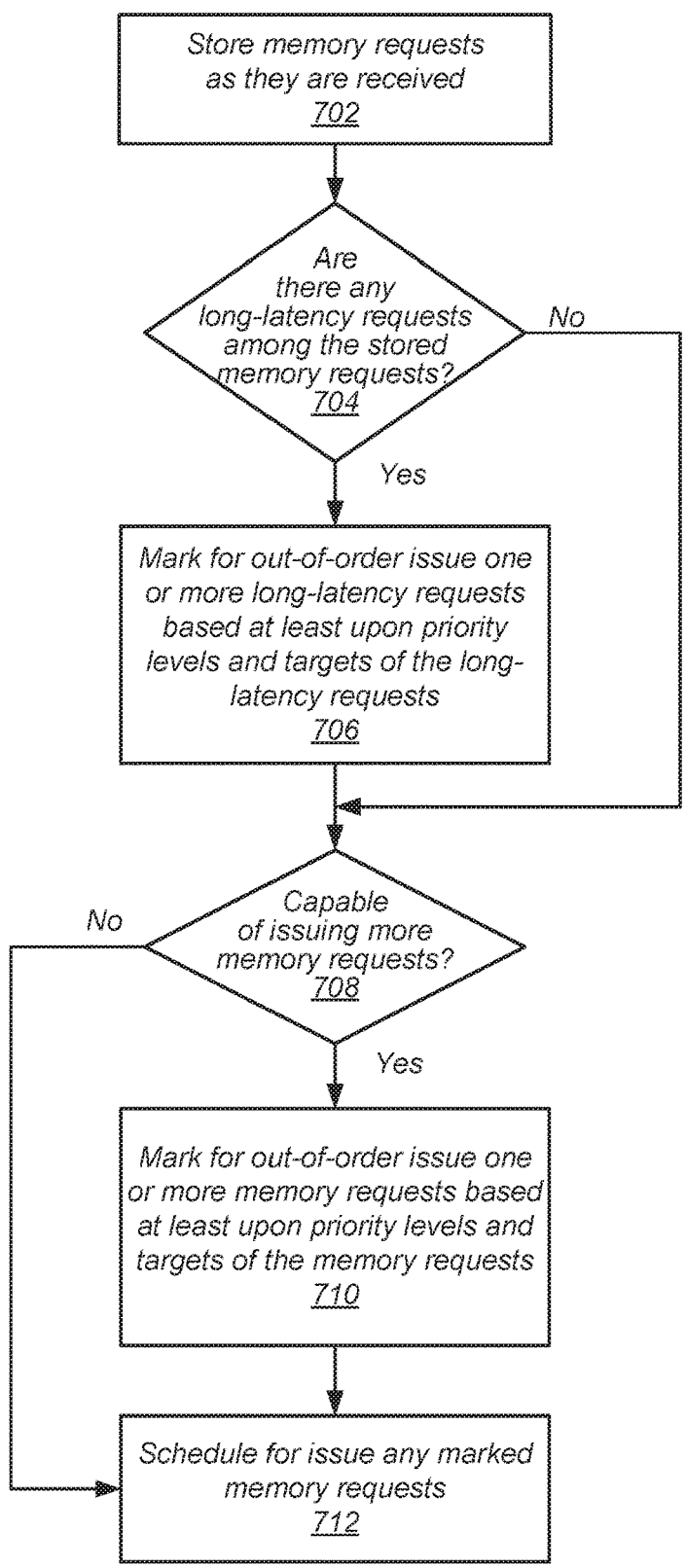
FIG. 7 is a flow diagram of one embodiment of a method for processing memory requests.

Referring now to FIG. 7, one embodiment of a method 700 for processing memory requests is shown. Hardware circuits for processing long-latency requests is distributed among a load queue of a processor core, cache controllers, memory controllers, and routing logic in a communication fabric. The hardware circuits store memory requests as they are received (block 702). If there are any long-latency requests among the stored memory requests ("yes" branch of the conditional block 704), then the hardware circuits mark for out-of-order issue one or more long-latency requests based at least upon priority levels (block 706). In some embodiments, the target of the long-latency requests, such as a particular memory channel of a memory device, is also considered for selection of out-of-order issue. If there are no long-latency requests among the stored memory requests ("no" branch of the conditional block 704), then control flow of method 700 skips block 706 and moves to conditional block 708.

If the hardware circuits are capable of issuing more memory requests ("yes" branch of the conditional block 708), then the hardware circuits mark for out-of-order issue one or more memory requests based at least upon priority levels (block 710). In an embodiment, the hardware circuits are capable of issuing six memory requests in a clock cycle. If four long-latency memory requests are selected for issue, then the hardware circuits are capable of selecting two additional memory requests not marked as long-latency for issue in the same clock cycle. However, if there are six or more long-latency memory requests are available for selection, then the hardware circuits are unable to select additional memory requests not marked as long-latency for issue in the same clock cycle. If the hardware circuits are unable to issue more memory requests ("no" branch of the conditional block 708), then control flow of method 700 skips block 710 and moves to block 712. At block 712, the hardware circuits schedule for issue any marked memory requests.

Figure 8:
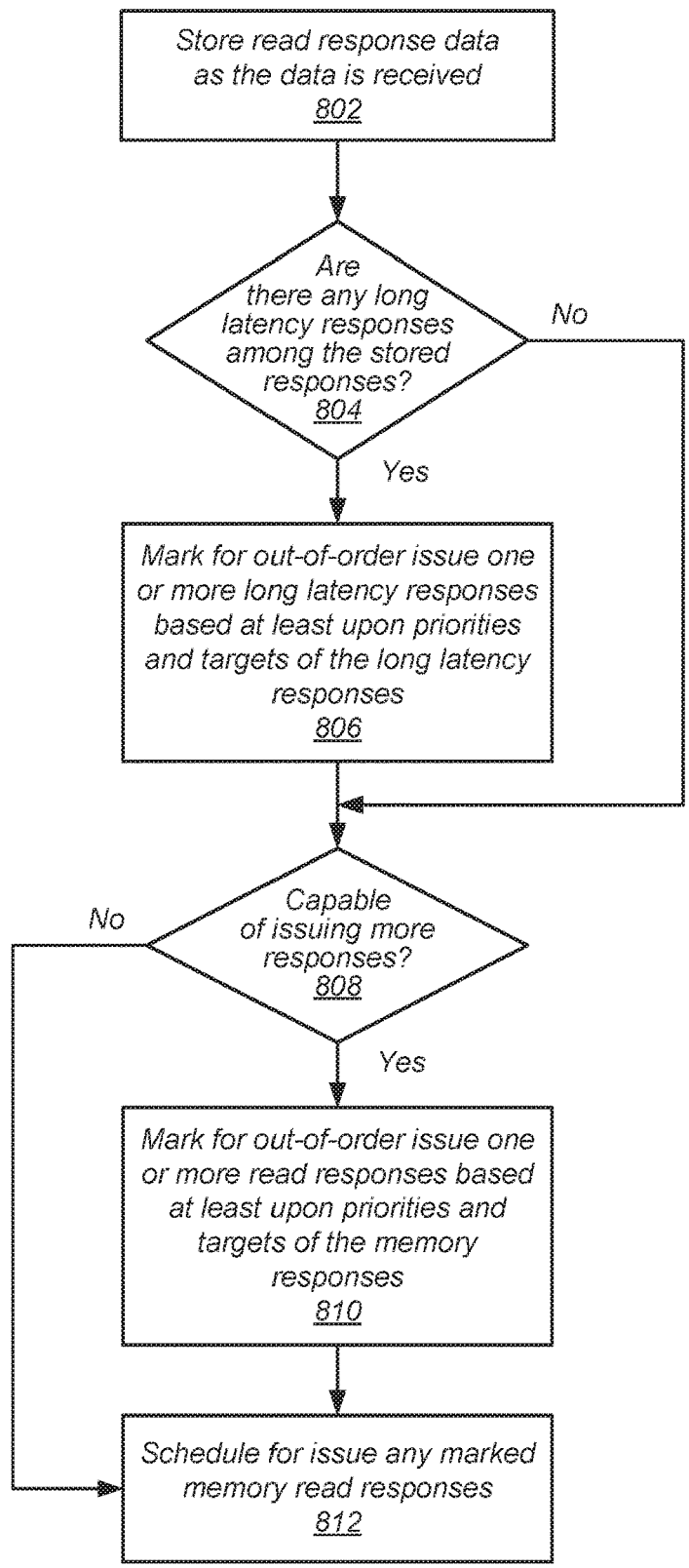
FIG. 8 is a flow diagram of one embodiment of a method for processing memory responses.

Turning now to FIG. 8, one embodiment of a method 800 for processing memory responses is shown. Circuitry for processing long-latency responses is distributed among a load queue of a processor core, cache controllers, memory controllers, and routing logic in a communication fabric. The circuitry stores read response data as the data is received (block 802). If there are any long-latency responses among the stored responses ("yes" branch of the conditional block 804), then the circuitry marks for out-of-order issue one or more long-latency responses based at least upon priority levels (block 806). If there are no long-latency responses among the stored responses ("no" branch of the conditional block 804), then control flow of method 800 skips block 806 and moves to conditional block 808.

If the circuitry is capable of issuing more responses ("yes" branch of the conditional block 808), then the circuitry marks for out-of-order issue one or more responses based at least upon priority levels and targets of the responses (block 810). In an embodiment, the circuitry is capable of issuing four memory responses in a clock cycle. If three long-latency memory responses are selected for issue, then the circuitry is capable of selecting one additional memory response not marked as long-latency for issue in the same clock cycle. However, if there are four or more long-latency memory responses are available for selection, then the circuitry is unable to select additional memory responses not marked as long-latency for issue in the same clock cycle. If the circuitry is unable to issue more responses ("no" branch of the conditional block 808), then control flow of method 800 skips block 810 and moves to block 812. At block 812, the circuitry schedules for issue any marked responses.

Figure 9:
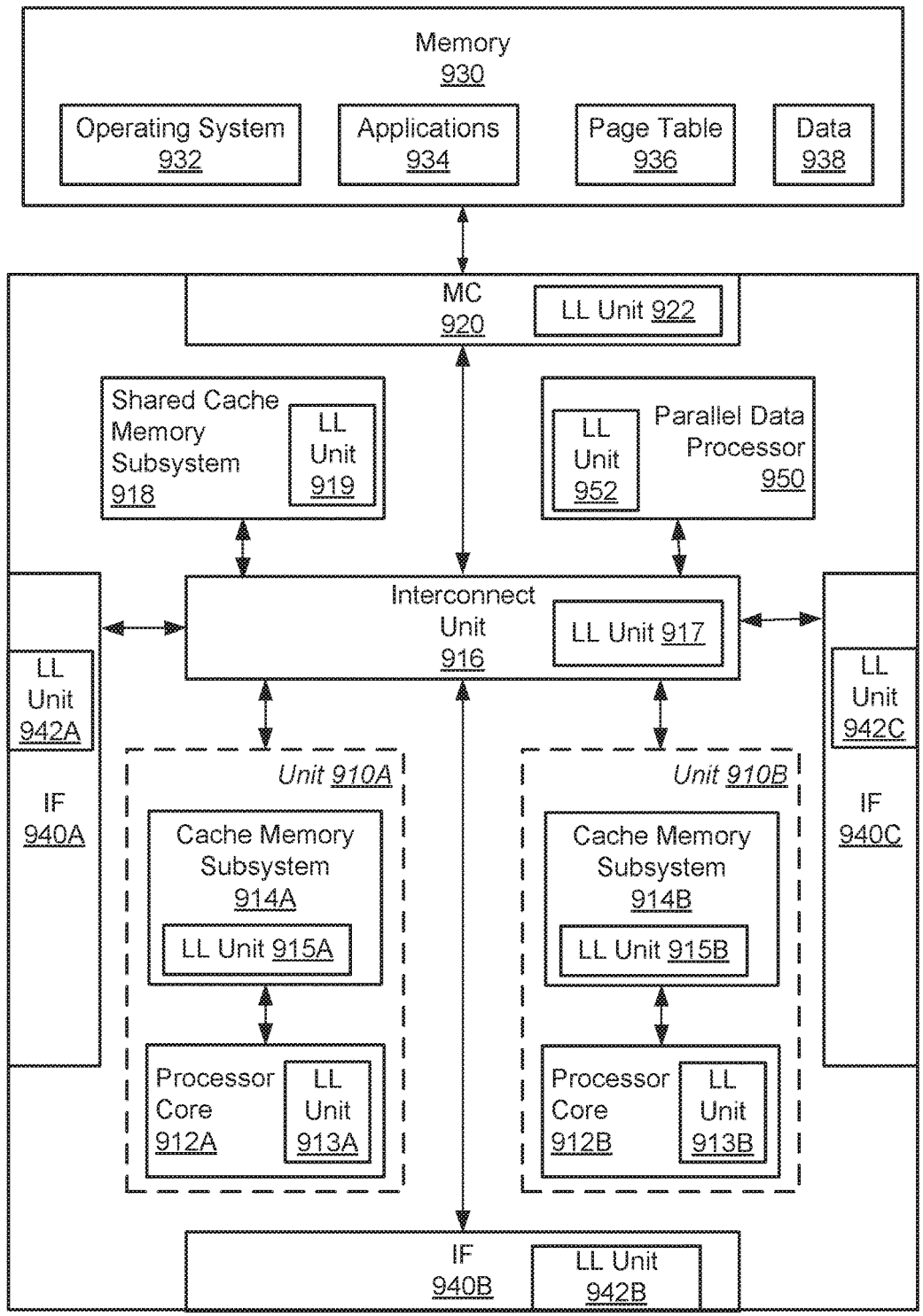
FIG. 9 is a block diagram of one embodiment of a microprocessor.

Referring to FIG. 9, one embodiment of an exemplary microprocessor 900 is shown. Microprocessor 900 includes memory controller 920 coupled to memory 930, interface logic 940A-940C, one or more processing units 912A-912B, crossbar interconnect logic 916, a shared cache memory subsystem 918, and a shared parallel data processor 950. Clock sources, such as phase lock loops (PLLs), interrupt controllers, and so forth are not shown in FIG. 9 for ease of illustration. It is also noted that the number of components of the microprocessor 900 and the number of subcomponents for those shown in FIG. 9, such as within each of the processing units 912A-912B, may vary from embodiment to embodiment. There may be more or fewer of each component/subcomponent than the number shown for the microprocessor 900.

In one embodiment, the illustrated functionality of microprocessor 900 is incorporated upon a single integrated circuit. For example, the microprocessor 900 is a system on chip (SoC) that includes multiple types of integrated circuits on a single semiconductor die. The multiple types of integrated circuits provide separate functionalities. In other embodiments, the multiple integrated components are individual dies within a package such as a multi-chip module (MCM) or chipset. In yet other embodiments, the multiple components are individual dies or chips on a printed circuit board.

Interfaces 940A-940C generally provide interfaces for input/output (I/O) devices off the microprocessor 900 to the shared cache memory subsystem 918 and processing units 912A-912B. I/O devices include peripheral network devices such as printers, keyboards, monitors, cameras, card readers, hard or floppy disk drives or drive controllers, network interface cards, video accelerators, audio cards, modems and a variety of data acquisition cards. The I/O devices are shared by each of the processing units 912A-912B and the parallel data processor 950 of microprocessor 900. Additionally, these I/O devices are shared by processing units 912A-912B in other microprocessors. Interfaces 940A-940C communicate with these other microprocessors and/or other processing nodes. Generally, interfaces 940A-940C include buffers for receiving packets from a corresponding link and for buffering packets to be transmitted upon a corresponding link. Any suitable flow control mechanism is used for transmitting packets to and from microprocessor 900, and interconnect logic 916 supports the mechanism.

The parallel data processor 950 includes multiple processor cores and data storage buffers dedicated to parallel data applications such as graphics rendering, scientific computing and so on. In some embodiments, the parallel data processor 950 is a graphics processing unit (GPU). In other embodiments, the parallel data processor 950 is a programmable gate array (PGA), a digital signal processor (DSP), or other. As shown, processing units 912A-912B include one or more processor cores 912A-912B and corresponding cache memory subsystems 914A-914B. Processor cores 912A-912B include circuitry for executing instructions according to a predefined general-purpose instruction set, and the processor cores 912A-912B support simultaneous multi-threading. The multiple threads executed by processor cores 912A-912B share at least the shared cache memory subsystem 918, the parallel data processor 950, and coupled I/O devices via interfaces 940A-940C.

Cache memory subsystems 914A-914B and 918 use high speed cache memories for storing blocks of data. In some embodiments, cache memory subsystems 914A-914B are integrated within respective processor cores 912A-912B. Alternatively, cache memory subsystems 914A-914B are connected to processor cores 912A-912B in a backside cache configuration or an inline configuration, as desired. In various embodiments, cache memory subsystems 914A-914B are implemented as a hierarchy of caches. Caches, which are nearer processor cores 912A-912B (within the hierarchy), are integrated into processor cores 912, if desired. In one embodiment, cache memory subsystems 914A-914B each represent L2 cache structures, and shared cache subsystem 918 represents an L3 cache structure.

Microprocessor 900 is connected to a respective memory 930 via a respective memory controller 920. The memory 930 uses any of a variety of types of memory devices. Memory 930 is shown to include operating system code 932. The operating system 932 includes a scheduler for assigning software threads to hardware in the microprocessor 900. Memory 930 also includes one or more of a hypervisor, a basic input output software (BIOS) controlled function, one or more applications 934 using utilizing application programmer interfaces (APIs), a page table 936, and so forth. It is noted that various portions of the software that resides in memory 930 also have copies in one or more caches (914A-914B, 918), stored on a non-volatile storage device such as a hard disk (not shown), and so on. These portions are executed by one or more of the processor cores 912A-912B and parallel data processor 950. Data 938 represents source data for applications 934. In addition, data 938 represents result data and intermediate data generated during the execution of applications 934.

The address space of microprocessor 900 is divided among multiple memories. Each microprocessor 900 or a respective processing node, which includes microprocessor 900, uses a memory map used to determine which addresses are mapped to which memories, and hence to which microprocessor 900 or processing node a memory request for a particular address should be routed. In one embodiment, the coherency point for an address is the memory controller 920 connected to the memory storing bytes corresponding to the address. Memory controller 920 includes control circuitry for interfacing to memories and request queues for queuing memory requests.

In various embodiments, the address space for memory 930 includes a virtual address space partitioned into a particular page size with virtual pages mapped to physical memory frames. These virtual-to-physical address mappings are stored in page table 936. The page table 936 includes multiple page table entries. Each of these page table entries includes the virtual-to-physical address mappings and also includes data access permissions corresponding to these address mappings. Copies of portions of the page table 936 are stored in one or more translation look-aside buffers (TLBs) corresponding to one or more caches (914A-914B, 918).

As described earlier, circuitry marks memory requests as long-latency requests and marks read responses as long-latency responses based on determining particular conditions have occurred. Examples of the conditions (or events) are a translation lookaside buffer (TLB) miss whether the TLB is used with an instruction cache or a data cache, an instruction cache miss, a branch misprediction, a memory dependence misprediction, and a precise exception. The circuitry is included in load queues of processor cores 912A-912B, cache controllers of caches 914A-914B and 918, interconnect logic 916 and interfaces 940A-940C. For example, this circuitry is included in long-latency (LL) units 913A-913B, 915A-915B, 917, 919, 942A-942C and 952.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a queue comprising a first memory request with a first priority and a second memory request with a second priority higher than the first priority; and
   circuitry configured to:
   store an indication that the first memory request is a long-latency request, based at least in part on execution of the first memory request causing a page table walk; and
   cause the first memory request to issue prior to the second memory request, responsive to the indication that the first memory request is a long-latency request.

2. The apparatus as recited in claim 1, wherein the circuitry is further configured to mark, for issue, the first memory request prior to marking for issue memory requests in the queue that are not identified as long-latency requests.

3. The apparatus as recited in claim 1, wherein the circuitry is configured to store the indication in an instruction tag of the first memory request.

4. The apparatus as recited in claim 1, wherein the circuitry is further configured to store an indication that a given memory request is a long-latency request, responsive to the given memory request being included in an alternate path of instructions fetched from an instruction cache into a processor pipeline after a mispredicted branch operation is detected and resolved.

5. The apparatus as recited in claim 1, wherein:
   the apparatus further comprises a second queue configured to store read responses; and
   the circuitry is further configured to identify one or more read responses as long-latency responses based on a detection that the one or more read responses correspond to long-latency requests.

6. The apparatus as recited in claim 5, wherein the circuitry is further configured to service one or more read requests with one or more read responses identified as long-latency responses before servicing any read requests with read responses not identified as long-latency read responses.

7. The apparatus as recited in claim 5, wherein the circuitry is further configured to mark, for issue, one or more long-latency read responses before marking, for issue, any read responses not identified as long-latency read responses.

8. A method, comprising:
   storing, in a queue, a first memory request with a first priority and a second memory request with a second priority higher than the first priority;
   storing, by circuitry, an indication that the first memory request is a long-latency request, based at least in part on execution of the first memory request causing a page table walk; and
   causing, by the circuitry, the first memory request to issue prior to the second memory request, responsive to the indication that the first memory request is a long-latency request.

9. The method as recited in claim 8, further comprising marking, for issue, the first memory request prior to marking for issue memory requests in the queue that are not identified as long-latency requests.

10. The method as recited in claim 8, further comprising storing the indication in an instruction tag of the first memory request.

11. The method as recited in claim 8, further comprising storing an indication that a given memory request is a long-latency request, responsive to the given memory request being included in an alternate path of instructions fetched from an instruction cache into a processor pipeline after a mispredicted branch operation is detected and resolved.

12. The method as recited in claim 8, wherein:
   storing, in a second queue, read responses; and
   identifying one or more read responses as long-latency responses based on a detection that the one or more read responses correspond to long-latency requests.

13. The method as recited in claim 12, further comprising servicing one or more read requests with one or more read responses identified as long-latency responses before servicing any read requests with read responses not identified as long-latency read responses.

14. The method as recited in claim 12, further comprising marking, for issue, one or more long-latency read responses before marking, for issue, any read responses not identified as long-latency read responses.

15. A computing system comprising:
   a processor core configured to generate memory requests;
   a controller configured to:
      store, in a queue, a first memory request with a first priority and a second memory request with a second priority higher than the first priority;
      store an indication that the first memory request is a long-latency request, based at least in part on execution of the first memory request causing a page table walk; and
      cause the first memory request to issue prior to the second memory request, responsive to the indication that the first memory request is a long-latency request.

16. The computing system as recited in claim 15, wherein the controller is further configured to mark, for issue, the first memory request prior to marking for issue memory requests in the queue that are not identified as long-latency requests.

17. The computing system as recited in claim 15, wherein the first memory request is a replay memory request.

18. The computing system as recited in claim 15, wherein the controller is further configured to store an indication that a given memory request is a long-latency request, responsive to the given memory request being included in an alternate path of instructions fetched from an instruction cache into a processor pipeline after a mispredicted branch operation is detected and resolved.

19. The computing system as recited in claim 15, wherein:
   the controller further comprises a second queue configured to store read responses; and
   the controller is further configured to identify one or more read responses as long-latency responses based on a detection that the one or more read responses correspond to long-latency requests.

20. The computing system as recited in claim 19, wherein the controller is further configured to service one or more read requests with one or more read responses identified as long-latency responses before servicing any read requests with read responses not identified as long-latency read responses.

* * * * *